Patented Nov. 11, 1941

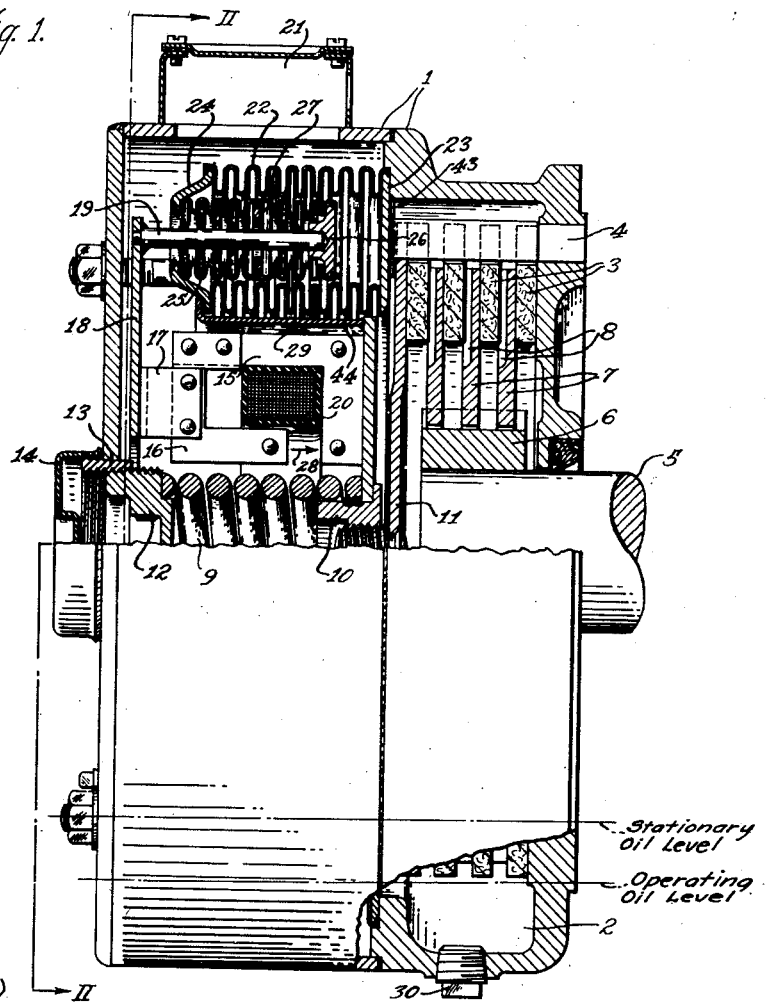

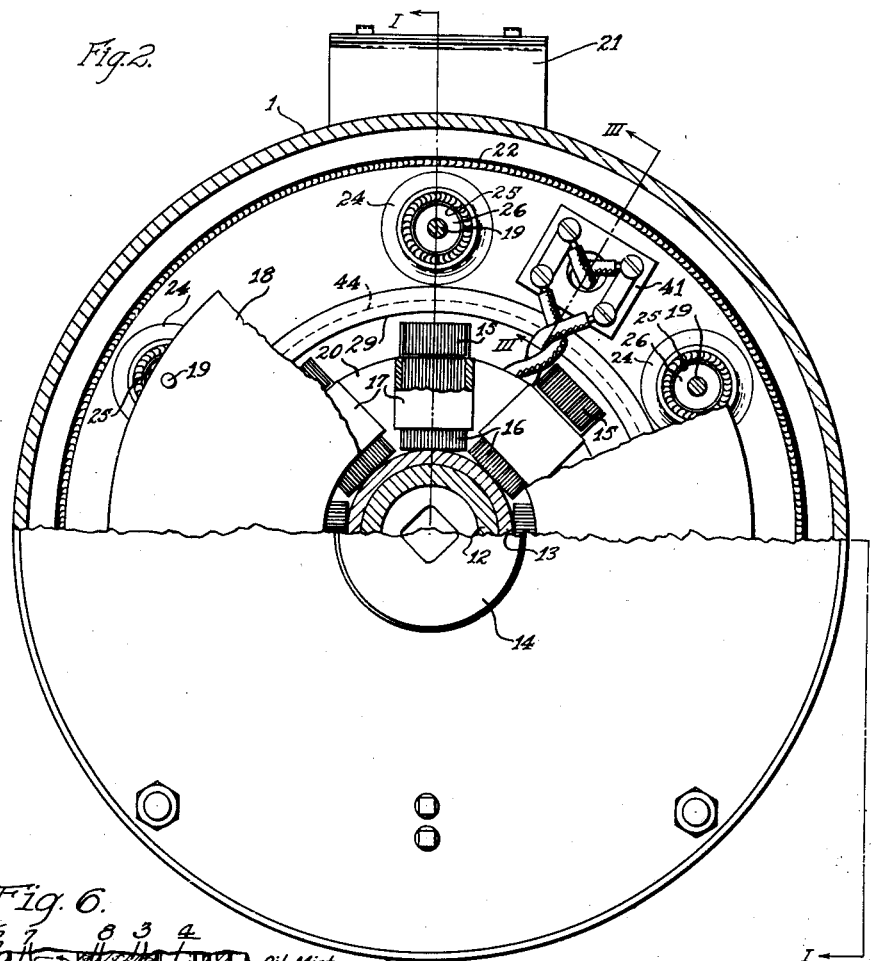

2,262,352

UNITED STATES PATENT OFFICE 2,262,352

ELECTROMAGNETIC HYDRAULIC DISK BRAKE OR CLUTCH

Edwin E. Arnold and Phelan McShane, Pittsburgh, Pa., assignors to Westinghouse Electric & Manufacturing Company, East Pittsburgh, Pa., a corporation of Pennsylvania Application January 26, 1939, Serial No. 252,926

19 Claims. (Cl. 188—171)

Our invention relates to an electromagnetically controlled, hydraulically actuated disk brake or clutch, and more specifically to a disk brake which is spring set in brake or clutch engagement and which is released by an alternating-current or direct-current operated electromagnet acting through a hydraulic force amplifying means.

An object of our invention is to provide a completely enclosed, therefore submersible, oil-cooled disk type brake or clutch which may be operated by either alternating current or direct current in either a horizontal or a vertical position without necessitating a change or adjustment with a change in operating position.

Another object of our invention is to provide between the magnet and the brake or clutch discs a novel hydraulic force amplifying means instead of mechanical levers or linkages.

Another object of our invention is to so construct the hydraulic force amplifying means that it may occupy a minimum amount of space and may use a minimum amount of fluid, such as oil, therein, but which still possesses a large force amplifying factor.

Other objects and advantages will become more apparent from a study of the following specification when considered in conjunction with the accompanying drawings, in which:

Figure 1 is a side view, partly in cross-section, taken on the line I—I of Fig. 2 of a motor brake employing the features in accordance with our invention;

Fig. 2 is a front or end view, partly in cross-section, taken along the line II—II of Fig. 1, showing the parts gradually broken away; that is, as line II—II of Fig. 1 is successively moved to the right, so that the interior parts of the brake structure may be more readily understood;

Fig. 3 is a partial sectional view taken along line III—III of Fig. 2;

Fig. 4 is a cross-sectional view similar to Fig. 1 but showing a modified form of the casing;

Fig. 5 is a partial sectional view similar to Fig. 1 but showing a modified form of a hydraulic force amplifying means, and Fig. 6 is a cross-sectional view of the device shown in Fig. 4, but with the axis in a vertical instead of a horizontal position.

Referring to Figs. 1 and 2, numeral 1 denotes a totally enclosed or hermetically sealed housing which has at the lower end thereof a sump 2, which forms a receptacle for oil or other similar lubricating and cooling fluid in the housing. Within the housing there is contained a brake mechanism comprising a plurality of stationary disks 3 which are restrained from circumferential movement with respect to the housing by means of a plurality of circumferentially spaced torque bars 4, which bars are rigidly secured to housing 1. A drive shaft 5, the rotation of which is to be controlled, has keyed thereto a spider member 6, upon which spider member there are positioned interfitting movable disks 7; that is, the disks 7 are movable longitudinally along the arms of spider 6 by virtue of their lower corresponding tooth-shaped portions which correspond to the toothed-shaped configuration of spider 6, and are driven circumferentially by the drive shaft 5 which is keyed to spider 6. The movable disks 7 have grooves 8 which permit oil or other liquid contained within the housing to pass along the brake disk surfaces, thereby cooling and lubricating them. Although the coefficient of friction of the brake disks is decreased by the oil, the braking capacity is or may be made sufficient by the addition of more disks. The oil greatly increases the life of the brake.

The brake disks are operated by means of the force exerted by helical spring 9, which acts through a wear adjusting nut 10 and a pressure plate 11, causing the stationary disks 3 and the movable disks 7 to be compressed together or brought into frictional engagement. A nut 12 adjusts the spring pressure, which nut is screwed within a threaded sleeve 13 onto which is screwed a cap or closure member 14.

In order to release the brake, an electromagnet is employed comprising a plurality of laminated L-shaped members 15 forming the core thereof, which core is secured to magnet coil structure 20 and ring-like member 29, and a corresponding plurality of L-shaped laminated pieces 16 forming the armature thereof, the armature being mounted on a plate 17, which plate is secured to a disk member 18, which in turn is connected by a plurality of struts 19 to the hydraulic force amplifying structure. Alternating current or direct current may be supplied to winding 20 of the electromagnet through housing 21, which forms a junction box for the purpose of wiring a motor to be controlled to magnet coil 20. In other words, if it is desired to control an electric motor, or other machine, the armature of which is coupled to shaft 5, then housing 1 will be rigidly connected to the housing of the motor and magnet coil 20 is wired to the motor so as to be interrupted therewith.

The hydraulic force amplifying means comprises a system of extensible corrugated metal bellows sometimes called by the trade-name "Sylphons," having an outer circular wall 22 and an inner circular wall 44 assembled coaxial with respect to drive shaft 5. Soldered or otherwise sealed to one end of the inner and outer concentric bellows is a ring-like closure plate 23, which plate is fixed to housing 1 through a ring-like position plate 43, thereby forming a stationary end for the bellows structure. Sealed to the other end of bellows 22 is a ring-shaped member 24, having a plurality of outward extending indentures having openings therethrough for mounting a plurality of small bellows 25 within the bellows 22—44, each of which has one end sealed to the ring-like, perforated member 24 and the other end sealed to a disk-shaped closure plate 26, which closure plate is connected to strut 19. It will be noted that by enclosing one of the bellows within the other, a very compact structure is secured in which there is a saving in the amount of oil used by an amount equal to the volume of the inner bellows without appreciably decreasing the force amplifying factor. A ring-like member 27 may be used to interconnect a number of small bellows units to form the completed bellows unit 25. A plurality of such hydraulic force applying means is used, all of which are circumferentially spaced along the rim of the ring-like member 29 about the interior of the housing 1, as will be obvious from an inspection of Fig. 2.

Hermetically sealed within the confines of bellows 22—44, and elements 23, 24 and 26 is a fluid, such as oil, which completely fills the enclosed ring-like space on the opposite side of the ring-shaped wall 45 (Fig. 2). Thus it will be seen that the volume of fluid cannot be altered. Inasmuch as bellows 22—44 is flexible in an axial direction, the overall length thereof may be changed; thus axial motion may be imparted to the ring-like member 24 in response to motion imparted to the small bellows 25. Thus if the force of the magnet through a given distance is imparted to the small bellows 25, thereby extending them to effect a large axial displacement inside the large ring bellows structure, the latter is made to extend in an opposite direction but with a force proportional to the ratios of the mean areas of the related parts. For instance, if the magnet acts on the small Sylphons through a distance of ½ inch with a force of 25 pounds, and the ratio of mean areas, let us assume, is 8, then the axial motion imparted to the ring-like elements 24 will be $\tfrac{1}{16}''$ and the resultant force will be 200 pounds. In other words, a small force imparted by member 26 of small area acting through a large axial distance will be converted into a large force exerted by member 24 of relatively large cross-sectional area acting through a small axial distance.

The operation of the device is as follows. Assume that the magnet 20 is deenergized. This will allow spring 9 to exert a force through elements 10 and 11 holding the disks 3 and 7 in frictional engagement, thereby restraining rotation of the shaft 5. When it is desired to release the brake, the magnet coil 20 is energized, thereby effecting attraction of armatures 16 to cores 15 in the direction of and to the extent indicated by arrow 28. The motion of armatures 16 is imparted to members 17, 18 and 19 to cause axial movement of members 26, which displaces the fluid contained within the bellows and effects a movement to the left of the large bellows 22 and ring-like members 24, and the force of the plurality of ring-like members 24 acts through a ring-like member 29 causing a movement to the left thereof (as viewed in Fig. 1) which effects compression of spring 9, thereby relieving the pressure exerted on the brake disks, and in this manner removing the restraint on shaft 5.

It is obvious, of course, that the structure described may be a clutch instead of a brake, in which event shaft 5 may be considered the driving shaft, and housing 1 may be considered part of the driven element, or vice versa, the necessary change to convert the brake to a clutch being apparent. The centrifugal action of brake disk 7 when shaft 5 is in rotation effects outward radial flow of oil through grooves 8, thereby cooling and lubricating the friction surfaces. Element 2 is the sole oil sump in this structure from which oil may be drained by the plug 30.

Fig. 3 is a sectional view taken along line III—III of Fig. 2, showing a compact lead-in arrangement by which the magnet wires are extended through a hole in the large ring-like bellows 22—44. Electrical conductors 42 extending from cable 38 project through a hole 40 in the ring-like member 23 and through a small "Sylphon" 39 which is sealed to plate 23 at one end thereof and at the other end thereof is sealed to the movable element 45 which is integral with rings 24. The fluid is confined between the Sylphons. Conductors 42 may be anchored to a binding post 41 from which they are lead to magnet 20. This arrangement shows a compact but effective way of assembling the various parts.

Fig. 4 is a modification of the device shown by Figs. 1 and 2, and is identical in every respect thereto except for the provision of an additional oil sump 31 and a conical runner 32, which runner conducts oil up the one side of the cone by centrifugal action and into the annular space (such as 2 shown in Fig. 1) machined in the housing where it backs up the stationary brake disks, and as the rotating brake disks are slowed down, the oil or oil-air mist moves through the holes 8 in a radial direction inwardly through all the disks within the housing. Although two sumps are used, only a single oil introducing plug 33 is needed, inasmuch as sump 31 and sump 2' are in communication with each other. Hence, it may readily be seen that by providing two oil sumps, either one may be used; in other words, the device is adapted for operation in the position shown in Fig. 1 or in the position at right angles thereto as shown in Fig. 6; that is, for vertical or horizontal operation.

Fig. 5 shows a modification of the hydraulic force amplifying means which is so constructed that a minimum amount of oil may be used, and which is especially adapted in situations where wide temperature changes are to be encountered. Ordinary light lubricating or transformer oil would be the natural fluid to use for filling the hydraulic element, but this has a relatively high coefficient of expansion, namely, close to .0007 per degree centigrade, or more easily visualized by saying its volume would increase 3½% for a change of 50° C. Such a change as this would doubtless affect and be detrimental to adjustments and the operation of a brake mechanism such as described. Obviously, the simple way to avoid, or at least reduce, the effect of temperature change, is to reduce the quantity of oil involved to a mere working minimum. Fig. 5 shows such an arrangement, wherein the large diameter ring-like bellows 34 has a quite small number of convolutions and a plurality of small, substantially cylindrical members 35 sealed thereto. The inner circular bellows 36 may be of the same length previously described, but now, however, there is only a very small working clearance between each inner "Sylphon" 36 and its corresponding cylindrical member 35, thereby limiting the oil contents to practically that required to fill the convolutions of each of the outer bellows 34. Obviously, the space of the annulus between the outer bellows 22 and the inner bellows 44 may be further reduced by displacement filler blocks or by a drawn-in depression in the ring-like end plate 37. According to this arrangement, the hydraulic element may retain the same motion pressure characteristic as the bellows structure previously described, but have only a small fraction of the sensitiveness to temperature change which would be well under the temperature and elastic properties of the cooperating elements, and thus would not be unduly sensitive to temperature change affecting adjustment or operation of the brake under widely different temperatures.

We are, of course, aware that others, particularly after having had the benefit of the teachings of our invention, may devise other forms of braking or clutching mechanism or the hydraulic force amplifying mechanism embodying our invention, and we, therefore, do not wish to be limited to the specific showings made in the drawings and the descriptive disclosure hereinbefore made, but wish to be limited only by the scope of the appended claims and such prior art as may be pertinent.

We claim as our invention:

1. A hydraulic force amplifying device comprising, in combination, an extensible bellows having a fixed end and a movable end, a second extensible bellows enclosed by said first bellows, having one end rigidly connected to one of the ends of said first bellows and the other end movable, a fluid contained between and hermetically sealed by said bellows, means for applying a force to said last mentioned end and means for receiving an amplified force from said rigidly interconnected ends, the space within said second bellows being open to the surrounding air.

2. A hydraulic force amplifying device comprising, in combination, an extensible metallic bellows having a fixed end and a movable end, a second extensible metallic bellows enclosed by said first diaphragm, having one end rigidly connected to one of the ends of said first bellows and the other end movable, a fluid contained between and hermetically sealed by said bellows, means for applying a force to said last mentioned end and means for receiving an amplified force from said rigidly interconnected ends, the space within said second bellows being open to the surrounding air.

3. A hydraulic force amplifying device comprising, in combination, an extensible bellows having a fixed end and a movable end, a second extensible bellows enclosed within said first bellows having one end rigidly connected to the movable end of said first bellows and the other end freely movable, a fluid which completely fills the space between said bellows and which is hermetically sealed by said bellows, means for applying a force to said last mentioned end and means for receiving an amplified force from said rigidly interconnected ends, the space within said second bellows being open to the surrounding air.

4. A hydraulic force amplifying device comprising, in combination, a bellows having on one end a closure element which is fixed and having on the other end a closure ring which is movable, a second bellows contained within said first bellows and which has one end fixed to said closure ring so as to be movable therewith and the other end closed by a second closure element, means for applying a force to said second closure plate and both said bellows, closure elements and closure ring forming a hermetically sealed container, a fluid which is contained within said hermetically sealed container, and means for receiving an amplified force from said movable closure ring the space within said second bellows being open to the surrounding air.

5. A hydraulic force amplifying device comprising, in combination, a metallic bellows having a substantially cylindrical outer wall and having sealed on one end a closure plate which is fixed, and sealed on the other end, a closure ring which is movable, a second substantially cylindrical metallic bellows contained within said first ellows having one end sealed to said closure ring and the other end sealed to a second closure plate; means for applying a force to said second closure plate and both said bellows, closure plates and closure ring forming a hermetically sealed container, said container being filled with oil, and means for receiving an amplified force from said movable closure ring the space within said second bellows being open to the surrounding air.

6. A hydraulic force amplifying device comprising, in combination, a substantially ring-shaped metallic bellows having sealed on one end a closure plate which is fixed, and sealed on the other end a closure ring which is movable, a second substantially cylindrical metallic bellows contained within said first bellows having one end sealed to said closure ring and the other end sealed to a second closure plate; both said bellows, closure plates and closure ring forming a hermetically sealed container, said container being filled with oil, the space within said second bellows being open to the surrounding air, means for applying a force to the closure plate of said second bellows which will effect movement of said closure ring and controllable means which is connected to said closure ring and to which the motion of said closure ring is transmitted.

7. A hydraulic force amplifying device comprising, in combination, a container having a perforated closure element sealed to one end thereof, an extensible bellows sealed to the other end of said container, the other end of said bellows being sealed to a closure element, the outer perimeter of said bellows being greater than the perimeter of said container, and a second extensible bellows which has a perimeter slightly less than that of said container and which is contained within said container, one end of said second extensible bellows being sealed to said perforated element and the other end thereof being sealed to a second closure element, means for applying a force to said second closure element, and means for receiving an amplified force from a portion of said container; said extensible bellows, container, closure elements and perforated closure element forming a hermetically sealed housing, and containing a fluid within said housing.

8. A hydraulic force amplifying device comprising, in combination, a substantially cylindrical container having a closure ring sealed to one end thereof, an extensible, corrugated bellows having a substantially cylindrical outer wall sealed to the other end of said container, the other end of said bellows being sealed to a closure element, the outer circumference of said bellows being substantially greater than that of said cylindrical container, and a second substantially cylindrical corrugated bellows which has an outer circumference which is slightly less than the circumference of said cylindrical container and which is contained within said cylindrical container, one end of said second bellows being sealed to said closure ring and the other being sealed to a second closure element, means for applying a force to said second closure element, and means for receiving an amplified force from a portion of said container; said bellows, container, closure ring and closure elements forming a hermetically sealed housing, and containing a fluid within said housing.

9. A hydraulic force amplifying device comprising, in combination, a substantially cylindrical metallic container having a closure ring sealed to one end thereof, an extensible metallic, corrugated bellows having a substantially cylindrical outer wall sealed to the other end of said container, the other end of said bellows being sealed to a closure element, the outer circumference of said bellows being substantially greater than the circumference of said cylindrical container, and a second substantially cylindrical, metallic, corrugated bellows which has an outer circumference which is slightly less than the circumference of said cylindrical container and which is contained within and is concentric with said cylindrical container, one end of said second bellows being sealed to said closure ring and the other end being sealed to a second closure element, means for applying a force to said second closure element, and means for receiving an amplified force from a portion of said container; said bellows, container, closure ring and closure elements forming a hermetically sealed housing, containing a fluid within said housing, and having a ring-like element supported within one of the folds of said second bellows.

10. A hydraulic force amplifying device comprising, in combination, a bellows having sealed at one end a perforated, fixed closure element and having sealed at the other end a second perforated but movable closure element, and a second bellows contained within said first bellows having one end sealed to one of said closure elements and another element sealed to the other of said closure elements; said bellows and closure elements forming a hermetically sealed housing, containing a liquid within said housing, and a force applying means contained within said housing, means for receiving an amplified force from said movable closure element the space within said second bellows being open to the surrounding air.

11. A hydraulic force amplifying device comprising, in combination, a bellows having sealed at one end a perforated, fixed closure element and having sealed at the other end a second perforated but movable closure element, and a second bellows contained within said first bellows having one end sealed to one of said closure elements and another element sealed to the other of said closure elements; said bellows and closure elements forming a hermetically sealed housing, containing a liquid within said housing, means for receiving an amplified force from said movable closure element the space within said second bellows being open to the surrounding air; and an electrical conductor element which extends through said second bellows and which is secured to one of the closure elements thereof.

12. A hydraulic brake comprising, in combination, a housing, a brake mechanism contained within said housing, means for controlling said brake mechanism, also contained within said housing, said means comprising, in combination, an extensible bellows having a fixed end and a movable end, and a second extensible bellows enclosed by said first bellows, having one end rigidly connected to one of the ends of said first bellows and the other end movable, a fluid contained between and hermetically sealed by said bellows, means for applying a force to said last mentioned end and means for receiving an amplified force from said rigidly interconnected ends, and the space within said second diaphragm being open to the surrounding air.

13. A hydraulic brake comprising, in combination, a housing, a brake mechanism contained within said housing, means for controlling said brake mechanism, also contained within said housing, said means comprising, in combination, an extensible bellows having a fixed end and a movable end, and a second extensible bellows enclosed within said first bellows having one end rigidly connected to the movable end of said first bellows and the other end freely movable, a fluid which completely fills the space between said bellows and which is hermetically sealed by said bellows, means for applying a force to said last mentioned end and means for receiving an amplified force from said rigidly interconnected ends, and the space within said second bellows being open to the surrounding air.

14. A hydraulic brake comprising, in combination, a housing, a brake mechanism contained within said housing, means for controlling said brake mechanism, also contained within said housing, said means comprising, in combination, a bellows having on one end a closure element which is fixed and having on the other end a plurality of closure rings which are movable, and a plurality of small bellows contained within said first bellows and each of which has one end fixed to said closure ring so as to be movable therewith and the other end closed by a second closure element; all of said bellows, closure elements and closure rings forming a hermetically sealed container, containing a fluid within said hermetically sealed container, and the space within each of said second bellows being open to the surrounding air.

15. A hydraulic brake comprising, in combination, a housing, a brake mechanism contained within said housing, means for controlling said brake mechanism, also contained within said housing, said means comprising, in combination, a substantially ring-shaped metallic bellows having sealed on one end a closure ring which is fixed and sealed on the other end, a closure ring which is movable, and a plurality of substantially cylindrical metallic bellows each having one end sealed to said movable closure ring and the other end sealed to a closure plate; said bellows, closure plate and closure rings forming a hermetically sealed container which may be filled with oil, and the space within said second bellows being open to the surrounding air.

16. A hydraulic brake comprising, in combination, a housing, a brake mechanism contained within said housing, means for controlling said brake mechanism, also contained within said housing, said means comprising, in combination, a substantially ring-shaped metallic bellows having sealed on one end a closure ring which is fixed and sealed on the other end, a closure ring which is movable, a plurality of small, substantially cylindrical metallic bellows having one end sealed to said movable closure ring and the other end sealed to a closure plate; said bellows, closure plate and closure rings forming a hermetically sealed container normally filled with oil, the space within said second bellows being open to the surrounding air, means for applying a force to the closure plates of said second bellows which will effect movement of said movable closure ring, and controllable means which is connected to said closure ring for effecting motion thereto.

17. A hydraulic brake comprising, in combination, a hermeticaly sealed housing, a brake mechanism, and a cooling and lubricating liquid contained within said housing, a pair of sumps formed in said housing at right angles to and in communication with each other to provide alternate sumps for said liquid so as to permit operation of the brake mechanism in either of two positions at right angles to each other, hydraulic brake operating means contained within said housing comprising, in combination, an extensible bellows having a fixed end and a movable end, and a second extensible bellows enclosed by said first bellows, having one end fixed to one of the ends of said first bellows and the other end movable, a fluid contained between and hermetically sealed by said bellows, the space within said second bellows being open to the surrounding air.

18. A hydraulic brake comprising, in combination, a housing, a brake mechanism contained within said housing, spring means for operating said brake mechanism, and electromagnetic means for releasing said brake mechanism, said last-named means including an armature and a hydraulic force amplifying means, said hydraulic force amplifying means comprising, in combination, an extensible bellows having a fixed end and a movable end, and a second extensible bellows enclosed by said first bellows, having one end fixed to one of the ends of said first bellows and the other end movable, a fluid contained between and hermetically sealed by said bellows, the space within said second bellows being open to the surrounding air, said armature being connected to said movable end of said second bellows.

19. A hydraulic brake comprising, in combination, a housing, a brake mechanism contained within said housing, spring means for operating said brake mechanism, and electromagnetic means for releasing said brake mechanism, said last-named means including an armature made up of L-shaped laminations and a core also made up of L-shaped laminations and a coil secured to said core, which armature and core are so arranged that when they are attracted to each other, the L-shaped laminations thereof form a rectangular closed path, and when they are separated from each other they form a rectangular path with a single air gap, and a hydraulic force amplifying means, said hydraulic force amplifying means comprising, in combination, an extensible bellows having a fixed end and a movable end, a second extensible bellows enclosed by said first bellows, having one end fixed to one of the ends of said first bellows and the other end movable, a fluid contained between and hermetically sealed by said bellows, the space within said second bellows being open to the surrounding air, said armature being connected to said movable end of said second bellows.

EDWIN E. ARNOLD.
PHELAN McSHANE.